US012444527B2

(12) United States Patent
Li et al.

(10) Patent No.: US 12,444,527 B2
(45) Date of Patent: Oct. 14, 2025

(54) DEVICE SEALED WITH MAGNETIC LIQUID

(71) Applicants: BEIJING JIAOTONG UNIVERSITY, Beijing (CN); TSINGHUA UNIVERSITY, Beijing (CN)

(72) Inventors: Decai Li, Beijing (CN); Zhibin Wang, Beijing (CN); Sijia Liu, Beijing (CN); Xinzhi He, Beijing (CN)

(73) Assignees: BEIJING JIAOTONG UNIVERSITY, Beijing (CN); TSINGHUA UNIVERSITY, Beijing (CN)

( * ) Notice: Subject to any disclaimer, the term of this patent is extended or adjusted under 35 U.S.C. 154(b) by 250 days.

(21) Appl. No.: 18/496,477

(22) Filed: Oct. 27, 2023

(65) Prior Publication Data
US 2024/0145144 A1    May 2, 2024

(30) Foreign Application Priority Data
Oct. 31, 2022   (CN) .......................... 202211345165.3

(51) Int. Cl.
*H01F 7/20*   (2006.01)
*H01F 1/44*   (2006.01)

(52) U.S. Cl.
CPC ..................... *H01F 7/20* (2013.01); *H01F 1/44* (2013.01)

(58) Field of Classification Search
CPC ..................... H01F 7/20; H01F 1/44
USPC ........................................... 355/296
See application file for complete search history.

(56) References Cited

U.S. PATENT DOCUMENTS

2025/0104881 A1*  3/2025  Li .................. F16C 33/765

FOREIGN PATENT DOCUMENTS

CN    109027249 A  * 12/2018  .............. F16J 15/43
CN    107740866 B  *  5/2023  .............. F16J 15/43

* cited by examiner

*Primary Examiner* — Shawki S Ismail
*Assistant Examiner* — Lisa N Homza
(74) *Attorney, Agent, or Firm* — Hodgson Russ LLP

(57) ABSTRACT

Provided is a device sealed with a magnetic liquid. The device includes: a rotary shaft, a tank body, a control unit, a first module, a second module, a magnetic liquid, and a pole-tooth. The first module and the second module are in the same configuration, each consists of an outer shell, a left pole-shoe, an electromagnet, a control wiring, a right pole-shoe, and a circlip. The device includes at least two modular structures; the control unit controls a first electromagnet and a second electromagnet to be magnetized to alternately bear a sealing role.

3 Claims, 1 Drawing Sheet

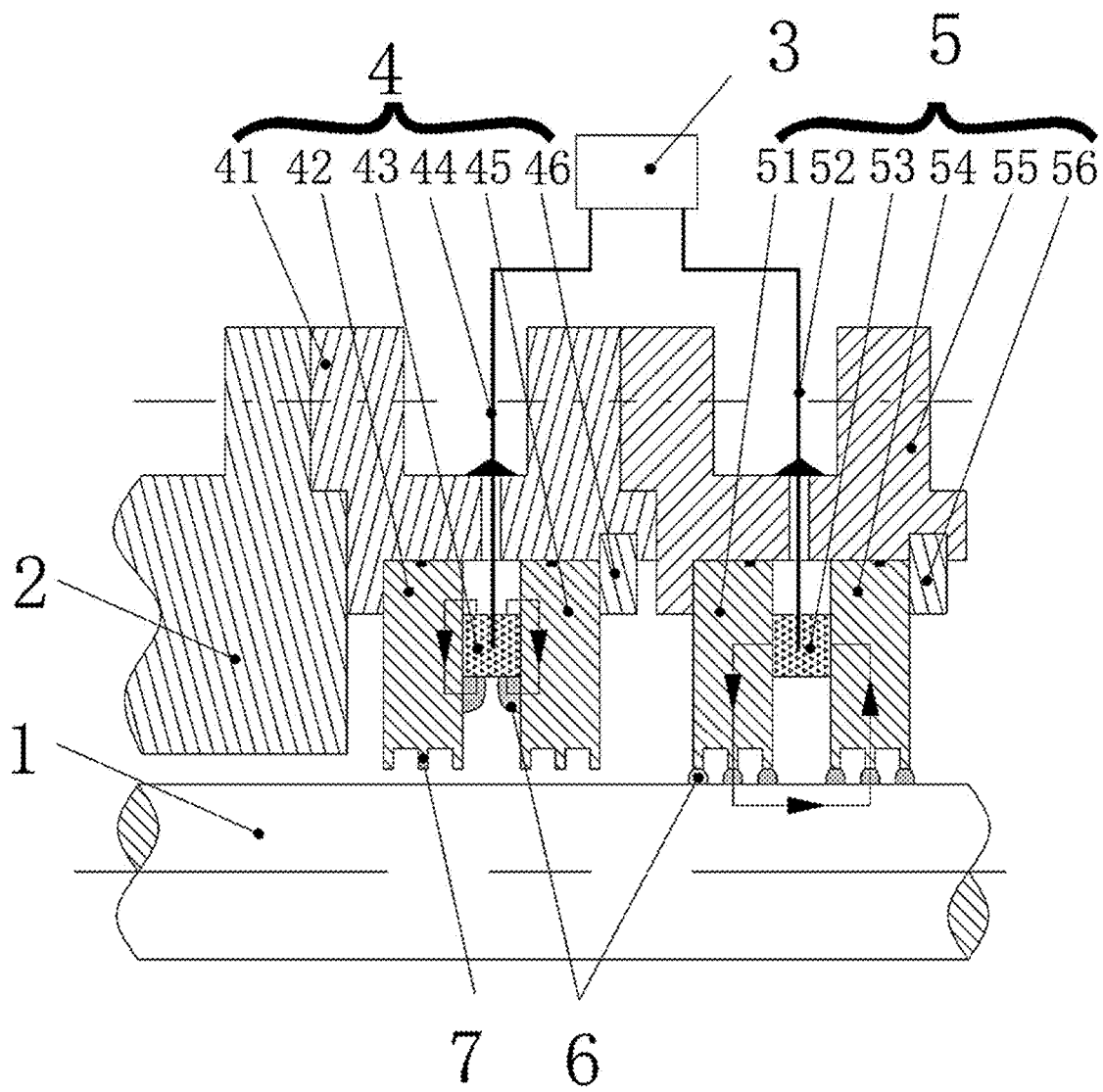

DEVICE SEALED WITH MAGNETIC LIQUID

CROSS-REFERENCE TO RELATED APPLICATIONS

This application claims priority to Chinese Patent Application No. 202211345165.3, filed on Oct. 31, 2022, the entire disclosure of which is incorporated herein by reference.

FIELD

The present disclosure relates to the field of mechanical engineering sealing technology, and is specifically related to a device sealed with a magnetic liquid that is sensitive to temperature.

BACKGROUND

A magnetic liquid filled in a space to be sealed in a traditional device sealed with the magnetic liquid will be of an increasing temperature due to being subject to continuous shear, even without direct contact between the two sealing surfaces. The magnetic liquid used in the traditional device is filled in the space to be sealed all along, thus being of a gradually-increasing temperature caused by the continuous shear along with continuous rotation of a rotary shaft without a cooling and heat dissipating period, which adversely influences a service life and a pressure-resistant capacity of the device. Thus, there is a need to provide a device alternately sealed with a magnetic liquid, thus enabling the magnetic liquid to dissipate heat.

SUMMARY

An object of the present disclosure is to provide a device sealed with a magnetic liquid.

The present disclosure provides in embodiments a device sealed with a magnetic liquid, the device including: a rotary shaft, a tank body, a control unit a first module, a second module, a magnetic liquid, and a pole-tooth,
  wherein the first module consists of a first outer shell, a first left pole-shoe, a first electromagnet, a first control wiring, a first right pole-shoe, and a first circlip; and the second module consists of a second left pole-shoe, a second control wiring, a second electromagnet, a second right pole-shoe, a second outer shell, and a second circlip,
  wherein the first left pole-shoe, the first right pole-shoe, the second left pole-shoe, and the second right pole-shoe each are provided with a gasket ring in a circular groove located at respective exterior circumferential surfaces; and the first left pole-shoe, the first right pole-shoe, the second left pole-shoe, and the second right pole-shoe each are provided with a plurality of the pole-teeth at respective interior circumferential surfaces,
  wherein the first left pole-shoe and the first electromagnet are installed in the first outer shell; the first control wiring has a first end connected to the first electromagnet through a first through-hole arranged in the first outer shell; the first right pole-shoe and the first circlip are installed in the first outer shell; and the first through-hole through which the first control wiring passes the first outer shell is sealed with a sealant,
  wherein the second left pole-shoe and the second electromagnet are installed in the second outer shell; the second control wiring has a second end connected to the second electromagnet through a second through-hole arranged in the second outer shell; the second right pole-shoe and the second circlip are installed in the second outer shell; and the second through-hole through which the second control wiring passes the second outer shell is sealed with the sealant,
  wherein the first module is installed at the tank body by bolt connection; the first control wiring has a third end connected to the control unit; the control unit is configured to provide a first electric current for magnetizing the first electromagnet in a first direction; the magnetic liquid is injected into a first space to be sealed between the first left pole-shoe, the first right pole-shoe and an exterior circumferential surface of the rotary shaft,
  wherein the second module is installed at the first module by bolt connection; the second control wiring has a fourth end connected to the control unit; the control unit is configure to provide a second electric current for magnetizing the second electromagnet in a second direction; the magnetic liquid is injected into a second space to be sealed between the second left pole-shoe, the second right pole-shoe and the exterior circumferential surface of the rotary shaft,
  wherein based on the first direction is an axial direction and the second direction is a radial direction, the magnetic liquid gathers:
  in the first space, between respective interior circumferential surfaces of the first left pole-shoe and the first right pole-shoe at the plurality of the pole-teeth and the exterior circumferential surface of the rotary shaft, for sealing; and
  between the second left pole-shoe and the second right pole-shoe away from the rotary shaft and near the second electromagnet, allowing for cooling and heat dissipating,
  wherein based on the first direction is the radial direction and the second direction is the axial direction, the magnetic liquid gathers:
  between the first left pole-shoe and the first right pole-shoe away from the rotary shaft and near the first electromagnet, allowing for cooling and heat dissipating; and
  in the second space, between respective interior circumferential surfaces of the second left pole-shoe and the second right pole-shoe at the plurality of the pole-teeth and the exterior circumferential surface of the rotary shaft, for sealing,
  wherein at least one of the first direction and the second direction is the axial direction.

BRIEF DESCRIPTION OF THE DRAWINGS

FIG. 1 is a schematic diagram showing a device sealed with a magnetic liquid.

REFERENCE SIGNS rotary shaft (1), tank body (2), control unit (3), first module (4), second module (5), magnetic liquid (6), and pole-tooth (7);
in the first module (4): first outer shell (41), first left pole-shoe (42), first electromagnet (43), first control wiring (44), first right pole-shoe (45), and first circlip (46);

in the second module (5): second left pole-shoe (51), second control wiring (52), second electromagnet (53), second right pole-shoe (54), second outer shell (55), and second circlip (56).

DETAILED DESCRIPTION

The present disclosure is further illustrated in specific embodiments in conjunction with attached drawings, however the following specific embodiments are only preferred embodiments of the present disclosure, but in no way construe any formal limitations on the present disclosure.

As shown in FIG. 1, the device sealed with a magnetic liquid includes:
- a rotary shaft (1), a tank body (2), a control unit (3), a first module (4), a second module (5), a magnetic liquid (6), and a pole-tooth (7),
- wherein the first module (4) consists of a first outer shell (41), a first left pole-shoe (42), a first electromagnet (43), a first control wiring (44), a first right pole-shoe (45), and a first circlip (46); and the second module (5) consists of a second left pole-shoe (51), a second control wiring (52), a second electromagnet (53), a second right pole-shoe (54), a second outer shell (55), and a second circlip (56),
- wherein the first left pole-shoe (42), the first right pole-shoe (45), the second left pole-shoe (51), and the second right pole-shoe (54) each are provided with a gasket ring in a circular groove located at respective exterior circumferential surfaces; and the first left pole-shoe (42), the first right pole-shoe (45), the second left pole-shoe (51), and the second right pole-shoe (54) each are provided with a plurality of the pole-teeth (7) at respective interior circumferential surfaces,
- wherein the first left pole-shoe (42) and the first electromagnet (43) are installed in the first outer shell (41); the first control wiring (44) has a first end connected to the first electromagnet (43) through a first through-hole arranged in the first outer shell (41); the first right pole-shoe (45) and the first circlip (46) are installed in the first outer shell (41); and the first through-hole through which the first control wiring (44) passes the first outer shell (41) is sealed with a sealant,
- wherein the second left pole-shoe (51) and the second electromagnet (53) are installed in the second outer shell (55); the second control wiring (52) has a second end connected to the second electromagnet (53) through a second through-hole arranged in the second outer shell (55); the second right pole-shoe (54) and the second circlip (56) are installed in the second outer shell (55); and the second through-hole through which the second control wiring (52) passes the second outer shell (55) is sealed with the sealant,
- wherein the first module (4) is installed at the tank body (2) by bolt connection; the first control wiring (44) has a third end connected to the control unit (3); the control unit (3) is configured to provide a first electric current for magnetizing the first electromagnet (43) in a first direction; the magnetic liquid (6) is injected into a first space to be sealed between the first left pole-shoe (42), the first right pole-shoe (45) and an exterior circumferential surface of the rotary shaft (1),
- wherein the second module (5) is installed at the first module (4) by bolt connection; the second control wiring (52) has a fourth end connected to the control unit (3); the control unit (3) is configure to provide a second electric current for magnetizing the second electromagnet (53) in a second direction; the magnetic liquid (6) is injected into a second space to be sealed between the second left pole-shoe (51), the second right pole-shoe (54) and the exterior circumferential surface of the rotary shaft,
- wherein based on the first direction is an axial direction and the second direction is a radial direction, the magnetic liquid (6) gathers:
- in the first space, between respective interior circumferential surfaces of the first left pole-shoe (42) and the first right pole-shoe (45) at the plurality of the pole-teeth (7) and the exterior circumferential surface of the rotary shaft (1), for sealing; and
- between the second left pole-shoe (51) and the second right pole-shoe (54) away from the rotary shaft (1) and near the second electromagnet (53), allowing for cooling and heat dissipating,
- wherein based on the first direction is the radial direction and the second direction is the axial direction, the magnetic liquid (6) gathers:
- between the first left pole-shoe (42) and the first right pole-shoe (45) away from the rotary shaft (1) and near the first electromagnet (43), allowing for cooling and heat dissipating; and
- in the second space, between respective interior circumferential surfaces of the second left pole-shoe (51) and the second right pole-shoe (54) at the plurality of the pole-teeth (7) and the exterior circumferential surface of the rotary shaft (1), for sealing,
- wherein at least one of the first direction and the second direction is the axial direction.

In some embodiments, the first module (4) and the second module (5) are in the same configuration, thus facilitating replacement, addition or deletion of such a modular structure, thereby being applicable to various sealing scenarios; the device includes at least the first module (4) and the second module (5) both, i.e., includes at least two modular structures, thus guaranteeing a cooling and heat dissipating period for the magnetic liquid in the first and second spaces to be sealed.

In some embodiments, the rotary shaft (1), the first left pole-shoe (42), the first right pole-shoe (45), the second left pole-shoe (51), and the second right pole-shoe (54) each are made of 2Cr13, which has good magnetic properties; and the tank body (2), the first outer shell (41), and the second outer shell (55) each are made of a non-permeability magnetic material.

The magnetic circuit is composed as illustrated below:
- when the second electromagnet (53) is axially magnetized, the magnetic field starts from the N-pole (at the left end as shown in FIG. 1) of the second electromagnet (53); passes through the second left pole-shoe (51), the magnetic liquid (6), the rotary shaft (1), the magnetic liquid (6) and the second right pole-shoe (54); and reaches the S-pole (at the right end as shown in FIG. 1) of the second electromagnet (53).
- when the first electromagnet (43) is radially magnetized resulting in two magnetic circuits: (i) the magnetic field starts from the N-pole (at the upper end as shown in FIG. 1) of the first electromagnet (43); passes through the passes through the first left pole-shoe (42) and the magnetic liquid (6); and reaches the S-pole (at the lower end as shown in FIG. 1) of the first electromagnet (43), and (ii) the magnetic field starts from the N-pole (at the upper end as shown in FIG. 1) of the first electromagnet (43); passes through the passes through the first right pole-shoe (45) and the magnetic liquid (6); and reaches the S-pole (at the lower end as shown in FIG. 1) of the first electromagnet (43).

The magnetic circuit of the magnetic field in the cased that the first electromagnet (43) is axially magnetized and the second electromagnet (53) is radially magnetized is not repeated herein, as the first module (4) and the second module (5) are in the same configuration.

The above embodiments only illustrate an example of the device with the minimum number of modules, which includes only the first module (4) and the second module (5), which shall not be construed to limit the device provided in the embodiments to only the first module (4) and the second module (5). The number of modular structures can be increased according to the actual application requirements.

As compared to the conventional device sealed with the magnetic liquid, the device sealed with a magnetic liquid in embodiments of the present disclosure is advantageous as below.

1. The first module (4) and the second module (5) are in the same configuration, thus facilitating replacement, addition or deletion of such a modular structure, thereby being applicable to various sealing scenarios.

2. The control unit (3) is capable of controlling the first electromagnet (43) and the second electromagnet (53) to be magnetized to alternately bear a sealing role.

In specific, one of the first electromagnet (43) and the second electromagnet (53) respectively in the first module (4) and the second module (5), bearing a sealing role, is magnetized in the axial direction, the magnetic liquid between the one module at the plurality of the pole-teeth (7) and the rotary shaft (1) is of a gradually-increasing temperature caused by a constant shearing force along with continuous rotation of the rotary shaft (1); at this time, the other one of the first electromagnet (43) and the second electromagnet (53) respectively in the first module (4) and the second module (5) is changed from a radial magnetizing direction to an axial magnetizing direction, starting to bear the sealing role, and the space to be sealed between the other module at the plurality of the pole-teeth (7) and the rotary shaft (1) is filled with sufficient magnetic liquid (6); while the one originally bearing the sealing role is changed from the axial magnetizing direction to the radial magnetizing direction, so that the magnetic liquid (6) leaves away from the space to be sealed between the one module at the plurality of the pole-teeth (7) and the rotary shaft (1) and gathers between the left pole-shoe and the right pole-shoe away from the rotary shaft (1) in the one module, leading to a decreasing temperature; the alternate magnetizing direction changes are continuously repeated during the rotation of the rotary shaft (1), thus avoiding the magnetic liquid from being sheared all along, enabling the magnetic liquid between each module and the rotary shaft (1) to have the cooling and heat dissipating period, and ensuring at least one electromagnet in the module is magnetized in the axial direction.

In the specification, it should be understood that, the terms indicating orientation or position relationship such as "central", "longitudinal", "lateral", "width", "thickness", "above", "below", "front", "rear", "right", "left", "vertical", "horizontal", "top", "bottom", "inner", "outer", "clockwise", "counter-clockwise", "axial", "radial", "circumferential" should be construed to refer to the orientation or position relationship as described or as shown in the drawings. These terms are merely for convenience and concision of description and do not alone indicate or imply that the device or element referred to must have a particular orientation or must be configured or operated in a particular orientation. Thus, it cannot be understood to limit the present disclosure.

In addition, terms such as "first" and "second" are used herein for purposes of description and are not intended to indicate or imply relative importance or significance or impliedly indicate quantity of the technical feature referred to. Thus, the feature defined with "first" and "second" may comprise one or more this feature. In the description of the present disclosure, "a plurality of" means two or more than two this features, unless specified otherwise.

In the present disclosure, unless specified or limited otherwise, the terms "install", "connected", "coupled", "fixed" and the like are used broadly, and may be, for example, fixed connections, detachable connections, or integrated connections; may also be mechanical or electrical connections; may also be direct connections or indirect connections via intervening structures; may also be inner communications of two elements or mutual interaction between two elements, which can be understood by those skilled in the art according to specific situations.

In the present disclosure, unless specified or limited otherwise, a structure in which a first feature is "on" or "below" a second feature may be an embodiment in which the first feature is in direct contact with the second feature, or an embodiment in which the first feature and the second feature are contacted indirectly via an intermediation. Furthermore, a first feature "on", "above", or "on top of" a second feature may include an embodiment in which the first feature is right or obliquely "on", "above", or "on top of" the second feature, or just means that the first feature is at a height higher than that of the second feature; while a first feature "below", "under", or "on bottom of" a second feature may include an embodiment in which the first feature is right or obliquely "below", "under", or "on bottom of" the second feature, or just means that the first feature is at a height lower than that of the second feature.

Reference throughout this specification to "an embodiment", "some embodiments", "one embodiment", "another example", "an example", "a specific example", or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example", or "in some examples" in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments in the scope of the present disclosure.

What is claimed is:

1. A device sealed with a magnetic liquid, the device comprising: a rotary shaft, a tank body, a control unit a first module, a second module, a magnetic liquid, and a pole-tooth, wherein the first module consists of a first outer shell, a first left pole-shoe, a first electromagnet, a first control wiring, a first right pole-shoe, and a first circlip; and the second module consists of a second left pole-shoe, a second control wiring, a second electromagnet, a second right pole-shoe, a second outer shell, and a second circlip, wherein the first left pole-shoe, the first right pole-shoe, the second left pole-shoe, and the second right pole-shoe each are provided with a gasket ring in a circular groove located at respective exterior circumferential surfaces; and the first left pole-shoe, the first right pole-shoe, the second left pole-shoe, and the second right pole-shoe each are provided with a plurality of pole-teeth at respective interior circumferential surfaces, wherein the first left pole-shoe and the first electromagnet are installed in the first outer shell; the first control wiring has a first end connected to the first electromagnet through a first through-hole arranged in the first outer shell; the first right pole-shoe and the first circlip are installed in the first outer shell; and the first through-hole through which the first control wiring passes the first outer shell is sealed with a sealant, wherein the second left pole-shoe and the second electromagnet are installed in the second outer shell; the second control wiring has a second end connected to the second electromagnet through a second through-hole arranged in the second outer shell; the second right pole-shoe and the second circlip are installed in the second outer shell; and the second through-hole through which the second control wiring passes the second outer shell is sealed with the sealant, wherein the first module is installed at the tank body by bolt connection; the first control wiring has a third end connected to the control unit; the control unit is configured to provide a first electric current for magnetizing the first electromagnet in a first direction; the magnetic liquid is injected into a first space to be sealed between the first left pole-shoe, the first right pole-shoe and an exterior circumferential surface of the rotary shaft, wherein the second module is installed at the first module by bolt connection; the second control wiring has a fourth end connected to the control unit; the control unit is configure to provide a second electric current for magnetizing the second electromagnet in a second direction; the magnetic liquid is injected into a second space to be sealed between the second left pole-shoe, the second right pole-shoe and the exterior circumferential surface of the rotary shaft, wherein based on the first direction is an axial direction and the second direction is a radial direction, the magnetic liquid gathers:
  in the first space, between respective interior circumferential surfaces of the first left pole-shoe and the first right pole-shoe at the plurality of pole-teeth and the exterior circumferential surface of the rotary shaft, for sealing; and
  between the second left pole-shoe and the second right pole-shoe away from the rotary shaft and near the second electromagnet, allowing for cooling and heat dissipating, wherein based on the first direction is the radial direction and the second direction is the axial direction, the magnetic liquid gathers:
  between the first left pole-shoe and the first right pole-shoe away from the rotary shaft and near the first electromagnet, allowing for cooling and heat dissipating; and
  in the second space, between respective interior circumferential surfaces of the second left pole-shoe and the second right pole-shoe at the plurality of pole-teeth and the exterior circumferential surface of the rotary shaft, for sealing, wherein at least one of the first direction and the second direction is the axial direction.

2. The device sealed with a magnetic liquid according to claim 1, wherein:
  the first module and the second module are in the same configuration; and
  the device comprises at least the first module and the second module both.

3. The device sealed with a magnetic liquid according to claim 1, wherein the rotary shaft, the first left pole-shoe, the first right pole-shoe, the second left pole-shoe, and the second right pole-shoe each are made of 2Cr13; and the tank body, the first outer shell, and the second outer shell each are made of a non-permeability magnetic material.

* * * * *